(12) United States Patent
Tuomikoski et al.

(10) Patent No.: US 10,390,197 B1
(45) Date of Patent: *Aug. 20, 2019

(54) SYSTEMS AND METHODS FOR AUTHENTICATING A CALLER USING BIOMETRIC AUTHENTICATION

(71) Applicant: United Services Automobile Association (USAA), San Antonio, TX (US)

(72) Inventors: David Tuomikoski, San Antonio, TX (US); Rochelle A. Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,547

(22) Filed: Dec. 18, 2018

Related U.S. Application Data

(63) Continuation of application No. 16/016,994, filed on Jun. 25, 2018, now Pat. No. 10,172,007, which is a
(Continued)

(51) Int. Cl.
*H04W 4/60* (2018.01)
*H04M 3/51* (2006.01)
(Continued)

(52) U.S. Cl.
CPC ........... *H04W 4/60* (2018.02); *H04L 63/0861* (2013.01); *H04L 63/205* (2013.01); *H04L 67/26* (2013.01);
(Continued)

(58) Field of Classification Search
CPC ...... H04W 4/60; H04W 4/14; H04L 63/0861; H04L 63/205; H04L 67/26; H04M 3/382;
(Continued)

(56) References Cited

U.S. PATENT DOCUMENTS 9,215,321 B2 * 12/2015 Timem ................. H04M 3/527
9,246,908 B2 * 1/2016 Little ................... H04L 63/0861
(Continued)

OTHER PUBLICATIONS

U.S. Appl. No. 16/016,994, filed Jun. 25, 2018, Systems and Methods for Authenticating a Caller Using Biometric Authentication.
(Continued)

*Primary Examiner* — William Nealon
(74) *Attorney, Agent, or Firm* — Perkins Coie LLP

(57) ABSTRACT

Methods and systems described in this disclosure receive a call from a device associated with a caller and determine whether the caller is eligible for biometric authentication via the device by sending, via a communications network, an eligibility determination request to an issuer of the device. In response to the caller being eligible for biometric authentication, a request to initiate a biometric authentication process on the device is sent to an issuer of the device, where biometric credentials are received by the device and an indication of whether the biometric credentials were verified is received from the issuer of the device.

17 Claims, 8 Drawing Sheets

Related U.S. Application Data continuation of application No. 15/379,694, filed on Dec. 15, 2016, now Pat. No. 10,034,174.

(60) Provisional application No. 62/270,171, filed on Dec. 21, 2015.

(51) Int. Cl.

| | |
|---|---|
| *H04L 29/06* | (2006.01) |
| *H04M 3/38* | (2006.01) |
| *H04W 4/14* | (2009.01) |
| *H04M 3/42* | (2006.01) |
| *H04L 29/08* | (2006.01) |

(52) U.S. Cl.
CPC ....... *H04M 3/382* (2013.01); *H04M 3/42059* (2013.01); *H04M 3/5166* (2013.01); *H04W 4/14* (2013.01); *H04M 2203/6045* (2013.01); *H04M 2203/6054* (2013.01)

(58) Field of Classification Search
CPC ........... H04M 3/42059; H04M 3/5166; H04M 2203/6045; H04M 2203/6054
USPC ........................................ 455/411
See application file for complete search history.

(56) References Cited

U.S. PATENT DOCUMENTS

| | | | | |
|---|---|---|---|---|
| 9,262,612 | B2* | 2/2016 | Cheyer | G06F 21/32 |
| 9,380,045 | B2* | 6/2016 | Gilboy | H04L 63/08 |
| 9,548,979 | B1* | 1/2017 | Johnson | H04L 63/0861 |
| 2007/0169182 | A1* | 7/2007 | Wolfond | G06F 21/31 |
| | | | | 726/7 |
| 2009/0080708 | A1* | 3/2009 | Mellen | G06F 21/32 |
| | | | | 382/115 |
| 2010/0242102 | A1* | 9/2010 | Cross | G06F 21/32 |
| | | | | 726/7 |
| 2010/0287369 | A1* | 11/2010 | Monden | G06F 21/32 |
| | | | | 713/156 |
| 2011/0314530 | A1* | 12/2011 | Donaldson | G06F 21/83 |
| | | | | 726/7 |
| 2013/0179692 | A1* | 7/2013 | Tolba | H04L 63/08 |
| | | | | 713/179 |
| 2013/0227651 | A1* | 8/2013 | Schultz | G06F 21/32 |
| | | | | 726/4 |
| 2014/0205077 | A1* | 7/2014 | Wood | H04M 3/42042 |
| | | | | 379/142.01 |
| 2014/0230032 | A1* | 8/2014 | Duncan | H04L 63/0861 |
| | | | | 726/7 |
| 2015/0028996 | A1* | 1/2015 | Agrafioti | G06F 21/40 |
| | | | | 340/5.82 |
| 2015/0095999 | A1* | 4/2015 | Toth | H04L 63/08 |
| | | | | 726/6 |
| 2015/0347734 | A1* | 12/2015 | Beigi | G06F 21/32 |
| | | | | 713/155 |
| 2015/0358317 | A1* | 12/2015 | Deutschmann | H04L 63/0861 |
| | | | | 713/186 |

OTHER PUBLICATIONS

U.S. Appl. No. 15/379,694 U.S. Appl. No. 10/034,174, filed Dec. 15, 2016, Systems and Methods for Authenticating a Caller Using Biometric Authentication.

U.S. Appl. No. 62/270,171, filed Dec. 21, 2015, Systems and Methods for Authenticating a Caller Using Biometric Authentication.

* cited by examiner

US 10,390,197 B1

SYSTEMS AND METHODS FOR AUTHENTICATING A CALLER USING BIOMETRIC AUTHENTICATION

CROSS-REFERENCE TO RELATED APPLICATIONS

This is a continuation of U.S. patent application Ser. No. 16/016,994, filed on Jun. 25, 2018, entitled "SYSTEMS AND METHODS FOR AUTHENTICATING A CALLER USING A BIOMETRIC AUTHENTICATION," now allowed, which is a continuation of U.S. patent application Ser. No. 15/379,694, filed on Dec. 15, 2016, entitled "SYSTEMS AND METHODS FOR AUTHENTICATING A CALLER USING A BIOMETRIC AUTHENTICATION," issued as U.S. Pat. No. 10,034,174, on Jul. 24, 2018, which is a non-provisional of and claims priority to U.S. Provisional Application No. 62/270,171, filed on Dec. 21, 2015, entitled "SYSTEMS AND METHODS FOR AUTHENTICATING A CALLER USING BIOMETRIC AUTHENTICATION," each of which are hereby incorporated by reference in their entireties for all purposes.

TECHNICAL FIELD

Various embodiments of the present disclosure generally relate to authentication. More specifically, various embodiments of the present disclosure relate to methods and systems for authenticating a caller.

BACKGROUND

Customers often call into an organization to inquire about a product, service, or status of an account the customer holds with the organization. The call may be answered by a customer service representative or an Interactive Voice Response (IVR) system.

BRIEF DESCRIPTION OF THE DRAWINGS

Embodiments of the present disclosure will be described and explained through the use of the accompanying drawings, in which.

DETAILED DESCRIPTION

Figure 1:
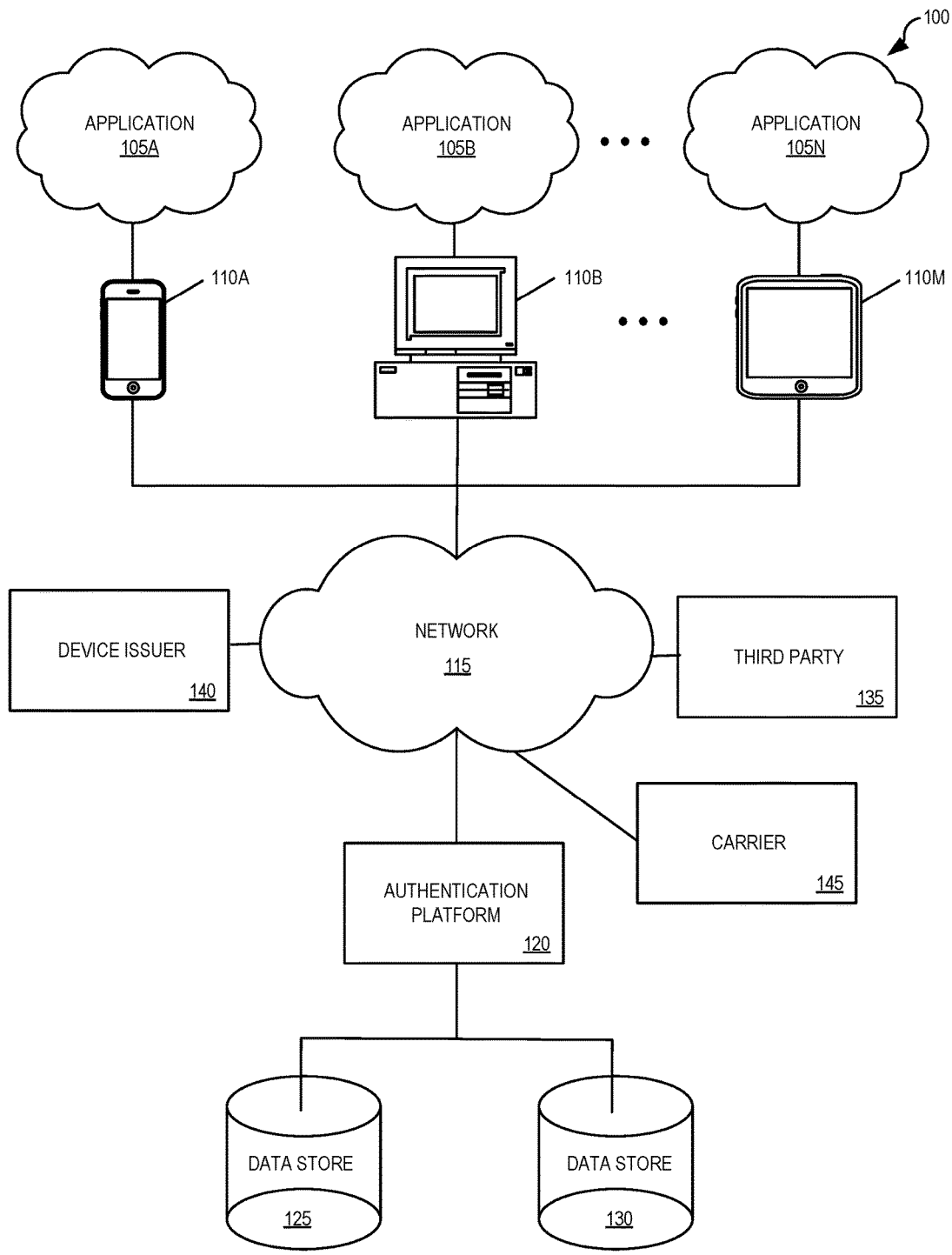
FIG. 1 illustrates an example of a network-based operating environment in accordance with various embodiments of the disclosure.

Various embodiments of the present disclosure generally relate to authentication. More specifically, various embodiments of the present disclosure relate to methods and systems for authenticating a caller.

When users call an organization on a standard voice line, organizations often have difficulty authenticating (i.e., identifying and verifying) the caller. For example, caller identification (ANI) can easily be spoofed and is thus not a reliable source of identification. Additionally, some callers attempt to bypass registration to be connected straight to a representative, resulting in the representative spending valuable time authenticating the caller. Authenticating the caller by asking challenge questions can be a lengthy process and, in some cases, is not a reliable method because much of the information requested in the challenge questions can be found on the Internet. Moreover, depending on the type of transaction or information requested by the caller, additional authentication information may be required or desired. Methods and systems disclosed herein allow users to be authenticated in a more secure and more efficient manner.

In certain circumstances, when the caller has downloaded a mobile application to the caller's device, the caller can be authenticated via the mobile application. For example, the organization can send a push notification to the device with a deep link to the mobile application, requesting that the caller provide authentication credentials (e.g., PIN, biometrics, password), which can be evaluated by the organization. However, when the caller does not have the application downloaded to the device or meet other criteria (e.g., having the application downloaded for a certain period of time, having the device registered with the organization for a certain period of time), the caller cannot be authenticated using the mobile application. Under these circumstances, or even if these circumstances do not exist, methods and systems described herein allow the caller to be authenticated without a mobile application using biometric authentication features on the caller's device.

In various embodiments, a user is authenticated to a call before speaking with a representative or an IVR system by providing biometric information through the user's device. After the user calls into an organization, the system may determine whether the caller is eligible for authentication using biometric information available through the device. If the user is eligible for authentication using biometric information collected by the device, the user may be prompted to provide biometric credentials through the user's mobile device (e.g., a fingerprint through Touch ID). After the user's credentials are received and verified (e.g., by a third party such as the issuer of the device), the user can be authenticated to the call such that no additional credentials are needed for the user to interact with the IVR or representative. Various third parties may assist with the authentication process, including determining when the caller is eligible for biometric authentication via the device.

More specifically, in some embodiments, the user can call into an organization and be identified by characteristics of the device (e.g., a phone number). The system may determine whether the caller is calling on a device that is capable of biometric authentication by analyzing characteristics of the call. For example, the system can determine whether the call is received via a landline network. When the call is received on a landline network, the call may be directed to an IVR or to a representative for alternate authentication methods. However, when the call is received on a cellular or other data network, in some embodiments, the call may be analyzed to determine whether the call is a voice-only call or whether the call is a voice-and-data call. When the call is a voice-only call, authentication methods other than biometric authentication may be used.

When the call is both on a cellular network and a voice-and-data call, additional characteristics such as phone number may be analyzed and used to determine a carrier of the call. The carrier (or other third party) can provide information such as the issuer of the device. The issuer of the device (or other third party) may then be contacted to determine whether the device is enrolled in biometric authentication via the device. The device issuer can provide such information and may perform additional checks such as determining whether the call is active and an identity of the parties to the call. When the device issuer confirms that the device is enrolled in biometric authentication and that the call is otherwise eligible for biometric authentication, the device issuer can begin a biometric authentication process on the calling device. The system (or the issuer) may prompt the user to provide the requested biometric credentials into the device. Once the user provides the biometric credentials into the device and the device or issuer verifies the credentials and notifies the enterprise, the user may be authenticated to the call with no further authentication needed to proceed with the call. When the credentials cannot be verified by the issuer or the device alerts the issuer that the biometric authentication attempt has failed, the call may be directed to an IVR system or representative to obtain authentication credentials in a different manner.

As mentioned above, in some embodiments, biometric authentication via the device may be a second method authentication when a first method of authentication is unavailable. In some embodiments, the first method of authentication can be authentication via a push notification that requests authentication credentials (a PIN, biometrics) via the mobile application. However, biometric authentication via the device may be used when the caller does not meet the criteria for the first method of authentication because the caller does not have the enterprise mobile application downloaded to the device. Therefore, in some embodiments, a check to determine whether the device is eligible for authentication via the mobile application is done prior to determining whether the caller can be authenticated using biometric authentication via the device.

In some embodiments, once the user is identified (e.g., via device identification), the authentication request may be sent to a user device, which can be the device the user is using to make the call or other devices and which is specified in the preferences of a user profile. Thus, in some embodiments, the caller may call into or contact the organization on one channel (e.g., a landline using a landline network, a computer using VoIP) and provide the biometric authentication on a second channel (e.g., a smart device using a cellular network or Wi-Fi).

Organizations allow users to access services and engage in activities through various channels. Examples of channels include modes of communication (e.g., a communications network) for exchanging data between devices. Devices may include, but are not limited to, computing devices, such as tablets, personal computers, and smartphones; point of sale devices; ATMs; connected smart devices, such as refrigerators, watches, and laptops; telephones, such as landline telephones or mobile phones; and face-to-face contact such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

Channels allow the user to engage in activities with an organization during a session. For example, a user may use a web portal or mobile application (i.e., a channel) to engage in activities, such as viewing an account, trading funds, purchasing insurance, or submitting or processing a negotiable instrument. Each channel may accept unique verifying information, and the verifying information may change depending upon the caller and/or the activity requested.

This disclosure describes authentication systems and methods designed to increase the security of calls received by an organization. Various embodiments may provide one or more of the following technological improvements: 1) improved accuracy in identifying and verifying callers, resulting in improved security; 2) increased efficiency in authenticating a caller, resulting in a shorter call time; 3) real-time or near real-time notification of a fraud event; and 4) an authentication process that is adaptable to multiple channels, including mobile applications, websites, and SMS messages.

In the following description, numerous specific details are set forth to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, device issuer 140, carrier 145, authentication platform 120, and data stores 125 and 130.

Computing devices 110A-110M may be configured to communicate via the network 115 with authentication platform 120. In some embodiments, computing devices 110A-110M can retrieve or submit information to authentication platform 120 and run one or more applications with customized content retrieved by authentication platform 120 and data stores 125 and 130. For example, computing devices 110A-110M can execute a browser application or a customized client to enable interaction between the computing devices 110A-110M, authentication platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol Security (IPsec).

Authentication platform 120 can run on one or more servers and can be used to receive calls, determine an identity of the caller, determine a method of authentication for the calls, analyze characteristics of the calls and/or devices, communicate with third parties, send push notifications, send SMS messages, authenticate callers, store profiles and/or policies in data stores 125 and 130, and/or perform other activities. In some embodiments, authentication platform 120 includes various data processing and analytic tools that allow for identity verification. In some embodiments, authentication platform 120 is a server.

Authentication platform 120 may be communicably coupled with third party 135, device issuer 140, carrier 145, data stores 125 and 130 and computing devices 110A-110M and may communicate, access, or receive data (e.g., device information, authentication information) from third party 135, computing devices 110A-110M and data stores 125 and 130. Authentication platform 120 may be associated with a membership organization (e.g., a financial institution or an insurance company), and the callers may be members of the membership organization.

Authentication platform 120 may be customized or calibrated by individual companies or service providers based on user needs and/or business objectives. For example, companies may have different business rules and/or different criteria for authenticating a caller and determining when to use which method of authentication.

Data stores 125 and 130 can be used to manage storage and access to user data such as authentication history, logon history, registered devices, information relating to the registered devices (e.g., when the device was registered, whether the mobile application is downloaded on the device, networks the device connects to), user preferences, location information, security questions and answers, and other information. Data stores 125 and 130 may be data repositories of a set of integrated objects that are modeled using classes defined in database schemas. Data stores 125 and 130 may further include flat files that can store data. Authentication platform 120 and/or other servers may collect and/or access data from the data stores 125 and 130.

Third party 135 may be any type of service to identify devices, carriers, networks, device issuers; send push notifications or text messages; perform biometric identification or verification services; and/or provide other functions related to identity and verification management. In some embodiments, third party 135 can collect data and provide the data to authentication platform 120. In an example, third party 135 can use characteristics of the call to determine an identity of the carrier 145 of the call and can request the carrier of the call to provide information relating to the device (e.g., the device issuer).

Carrier 145 may be a carrier of the call (e.g., AT&T, Verizon). Carrier 145 may have information regarding device issuer 140, the issuer of the device. Device issuer 140 can receive a request from authentication platform 120, carrier 145, or third party 135 to determine the status of the call and whether a caller/device has biometric authentication enabled on the device, to initiate a biometric authentication process on the caller's device, to verify the biometric credentials input by the caller, or to receive the results of the verification from the device, and then send results of the request (i.e., the results of the verification) to the authentication platform 120, carrier 145, or third party 135.

Figure 2:
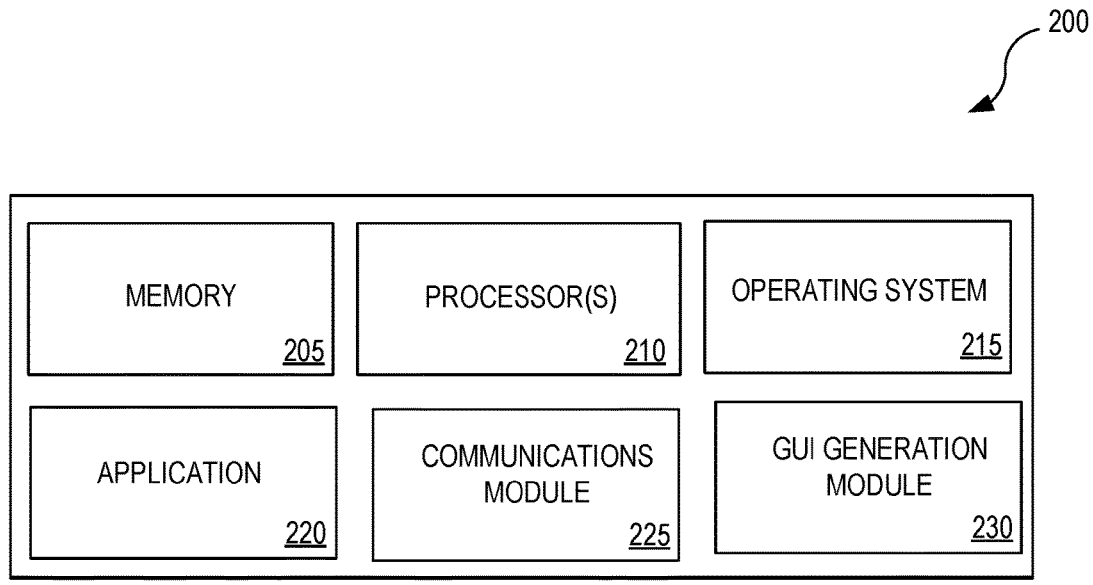
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, and graphical user interface (GUI) generation module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory, memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), DDR RAM, small outline dual inline memory modules (SODIMMs), EPROM, EEPROM, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, and GUI generation module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with authentication platform 120. For example, application 220 can include an application for financial services, a money transfer application, a social networking application, and a gaming application.

Application 220 can access a server and/or a platform associated with an organization (e.g., authentication platform 120) to display account data, display authentication requests and confirmations, and collect authentication information. For example, application 220 may be used to receive and take pictures of codes. In some embodiments, application 220 may collect biometric samples to identify the user, such as a face, a voice, eye movement, fingerprints, behavioral biometrics (e.g., keystrokes), etc. In some embodiments, the codes and/or biometric information are analyzed on the device 200, and in other embodiments, the data is sent to a device issuer and/or server of an organization by communications module 225 for analysis. Application 220 may include an authentication tab that is accessed when a deep link in a push notification is pressed. Application 220 may further direct a user to a login page to enter authentication credentials.

Communications module 230 can communicate with a third party (e.g., third party 135), carrier 145, device issuer 140, and/or a server (e.g., authentication platform 120). For example, communications module 230 may receive a prompt to provide biometric information via application 220 from authentication platform 120, third party 135, carrier 145, or device issuer 140. Communications module 230 may receive a request asking the user to provide authentication credentials using other methods, such as through the mobile application 220. Communications may be received via text message, push notification, or other type of messaging. Communication module 230 can send data such as an analysis of the authentication credentials or the authentication credentials themselves to authentication platform 120, third party 135, carrier 145, or device issuer 140.

GUI generation module 230 can generate one or more GUI screens that allow for interaction with a user. In at least one embodiment, GUI generation module 230 generates a graphical user interface receiving and/or conveying information to the user. For example, the GUI generation module 230 may display push notifications, text messages, or other prompts for the user.

Figure 3:
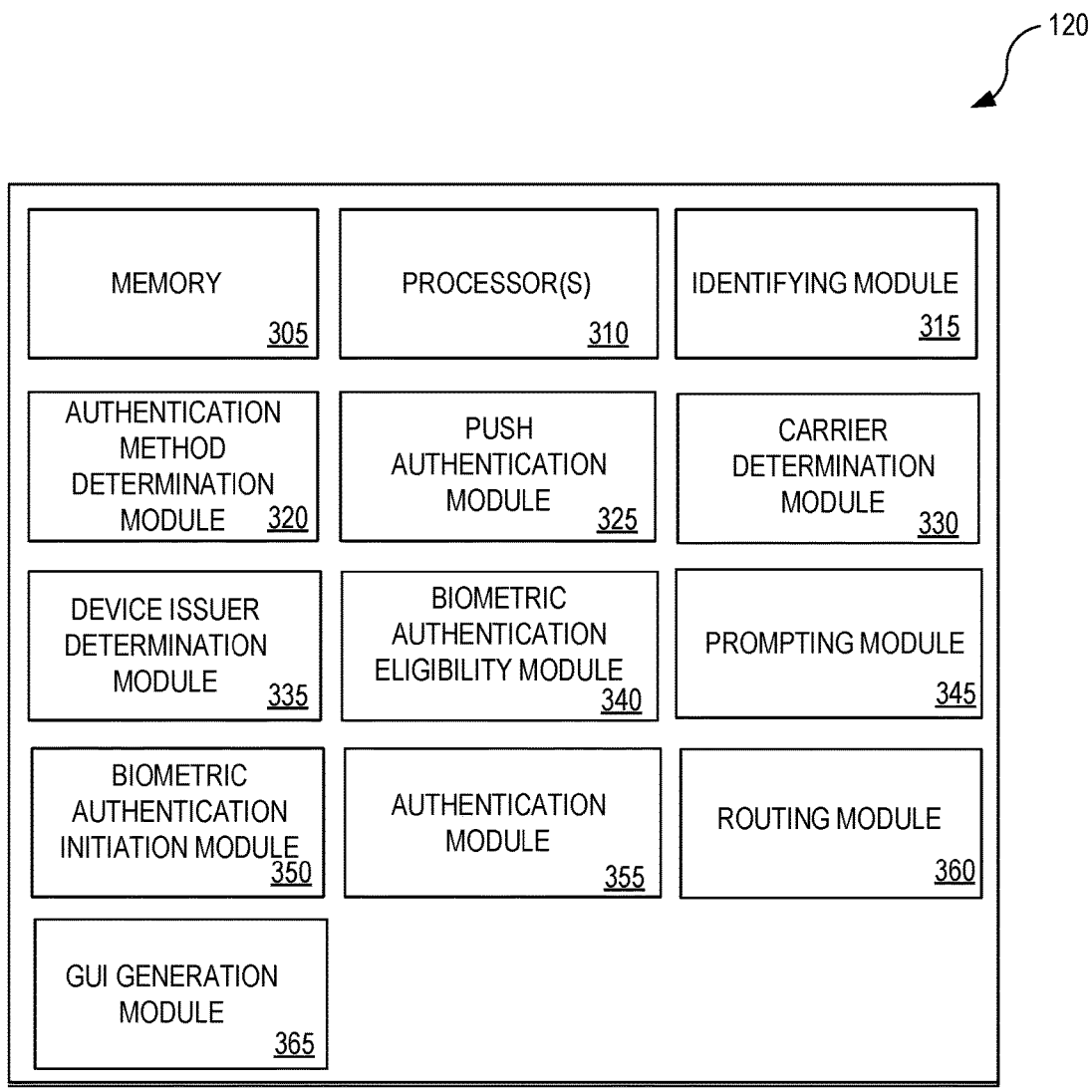
FIG. 3 illustrates various components of an authentication platform that may be used in accordance with various embodiments of the present disclosure.

FIG. 3 illustrates a set of components within authentication platform 120 according to one or more embodiments of the present disclosure. According to the embodiments shown in FIG. 3, authentication platform 120 can include memory 305, one or more processors 310, identifying module 315, authentication method determination module 320, push authentication module 325, carrier determination module 330, device issuer determination module 335, biometric authentication eligibility module 340, prompting module 345, biometric authentication initiation module 350, authentication module 355, routing module 360, and GUI generation module 365. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of identifying module 315, authentication method determination module 320, push authentication module 325, carrier determination module 330, device issuer determination module 335, biometric authentication eligibility module 340, prompting module 345, biometric authentication initiation module 350, authentication module 355, routing module 360, and GUI generation module 365.

Identifying module 315 receives a call from a device associated with a caller. Identifying module 315 may determine an identity of the device based on the phone number, location of the call, a network the device is connected to, and/or other identifying information. The device information may be used to determine a caller associated with the device. For example, users may have profiles that include one or more devices associated with the user and preferences for methods of authentication. Identifying module 315 may communicate the profile information to authentication method determination module 320.

Authentication method determination module 320 collects information and determines which method of authentication should be used to authenticate the caller. Authentication method determination module 320 can use information including a type of network the call is made from, whether an enterprise mobile application is downloaded on the user's device, the user's preferences (if any) in the user's profile, and whether the biometric authentication feature is enabled on the device. For example, if the call is received via a landline network, the user will not be authenticated using a push notification or biometric authentication on the device. When the mobile application is not downloaded on the device, authentication via the mobile application will not be used. Criteria for biometric authentication via the device may include having the biometric authentication feature enabled on the device, a call status of "live" between the device and the enterprise (i.e., meaning that the call between the device and the enterprise is active), and a network that supports both data and voice. When the caller/call/device is not eligible for biometric authentication via the device as determined by biometric authentication eligibility module 340, the biometric authentication via the device will not be used.

Should authentication via the mobile application and biometric authentication via the device not be available for the user, authentication method determination module 320 provides other methods of authentication. For example, the caller can be authenticated by an IVR or representative by providing certain information. Or, the caller may be sent a text message that includes a code that can be provided to an IVR or representative or a link to a website allowing the caller to provide login credentials.

When the mobile application is downloaded to the device and any other eligibility requirements are met for the user to authenticate via the mobile application, a push notification can be sent to the device. The push notification may include a link to an authentication page in a mobile application requesting authentication credentials from the user (e.g., biometrics, personal identification number (PIN)). The user can then be authenticated to the call when the authentication credentials received through the mobile application are verified.

Carrier determination module 330 determines a carrier for the call based on characteristics of the call such as phone number and network. In some embodiments, the carrier is not contacted or is contacted via a third party. After the carrier is determined, device issuer determination module 335 can determine the issuer of the device by contacting the carrier (or a third party).

Biometric authentication eligibility module 340 determines whether the caller is eligible for biometric authentication via the device. Biometric authentication eligibility module 340 determines whether the caller is enrolled in biometric authentication via the device (e.g., Touch ID on the device) by contacting the issuer of the device or other methods such as checking a data repository (e.g., if the user has authenticated using this method before). When the caller is not enrolled in biometric authentication via the device, the caller will not be authenticated using biometric authentication via the device. When the caller is enrolled in biometric authentication via the device, biometric authentication eligibility module 345 can determine or receive information regarding the call status to ensure that the call is active, that the call is between the correct parties (e.g., caller and enterprise), and that the call is able to transfer both voice and data messages instead of simply a voice call.

In some embodiments, the authentication platform asks the device issuer to determine whether the caller is eligible for biometric authentication via the device. This request may be made, and results may be received, on a network that is different from the network between the caller and the enterprise. The device issuer may send messages to the caller on a third network that is different from the first two networks. When eligibility conditions for biometric authentication via the device are not met, the caller may be authenticated using other authentication methods as determined by authentication method determination module 320.

When the conditions for biometric authentication via the device are met as determined by biometric authentication eligibility module 340, prompting module 345 prompts the caller to provide the biometric information via the device. Prompting module 345 may prompt the user by speaking to the user, by sending a text message, or by providing a different notification. The prompt can be sent by the enterprise and can be a screen with instructions (e.g., "place your finger on the home button"). In some embodiments, the device issuer can send the prompt as part of the biometric authentication initiation process.

Biometric authentication initiation module 350 initiates the biometric authentication process on the user's device. To initiate the biometric authentication, biometric authentication initiation module 350 may send a request to the device issuer (or other third party) to begin the biometric authentication process.

Authentication module 355 determines whether the caller is authenticated based on results sent from the device issuer. The device issuer or the device may compare characteristics of the biometric credentials received from the device with characteristics of previously collected biometric credentials. When the device analyzes the biometric data to determine whether the caller is authenticated, the device can communicate the authentication decision to the device issuer, and the device issuer can communicate the information to authentication module 355. In some embodiments, the device issuer determines that the caller should be authenticated based on how closely the characteristics of sample compare to previous samples.

Routing module 360 routes the call to an IVR or representative with an indication that the caller is authenticated based on the information from authentication module 355. When the biometric credentials are not verified or were not received by authentication module 355, routing module 360 may log the results, send the call to the fraud detection team, and/or direct the call to an IVR or representative with an indication that the caller has not been authenticated.

GUI generation module 365 is capable of generating one or more GUI screens that allow interaction with a user. In at least one embodiment, GUI generation module 365 generates a graphical user interface receiving information from and/or conveying information to the user. For example, GUI generation module 365 may display the caller's identity and preferences, the devices associated with the caller, and authentication information received or needed from the caller.

Figure 4:
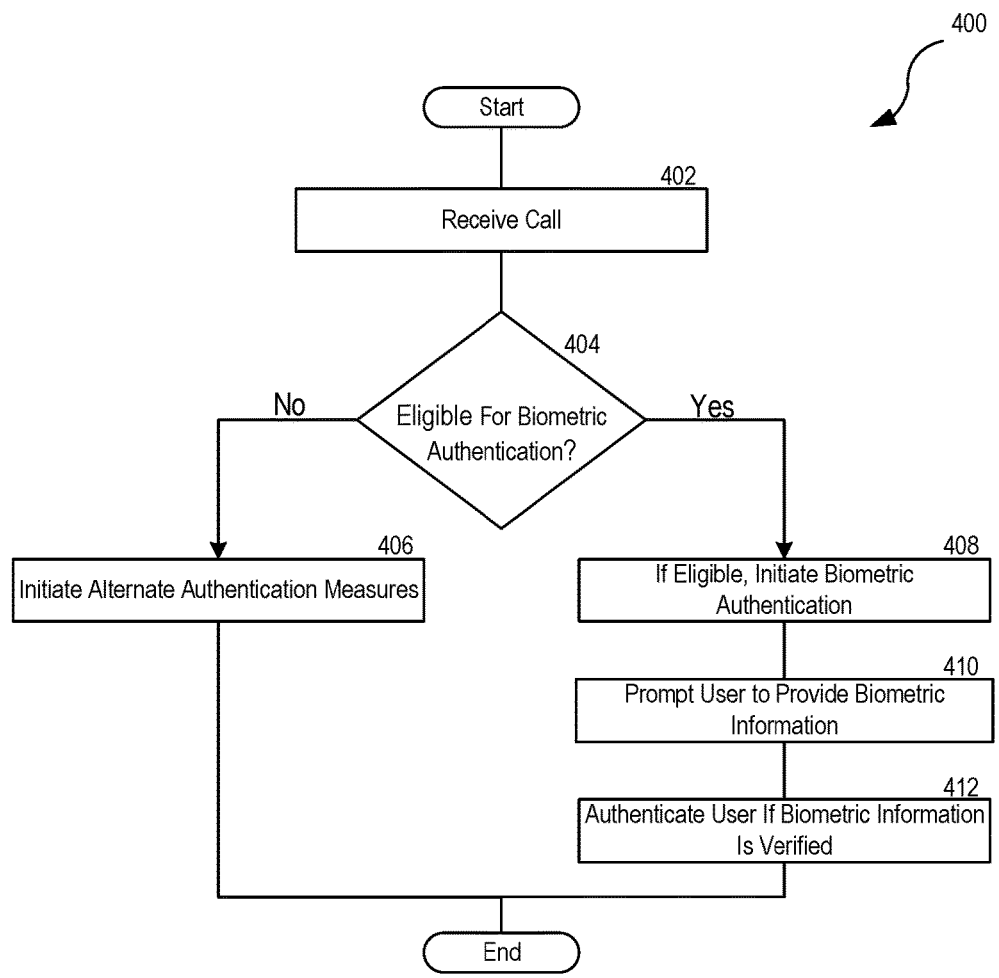
FIG. 4 is a flowchart illustrating a set of operations for authenticating a caller in accordance with various embodiments of the present disclosure.
Figure 5:
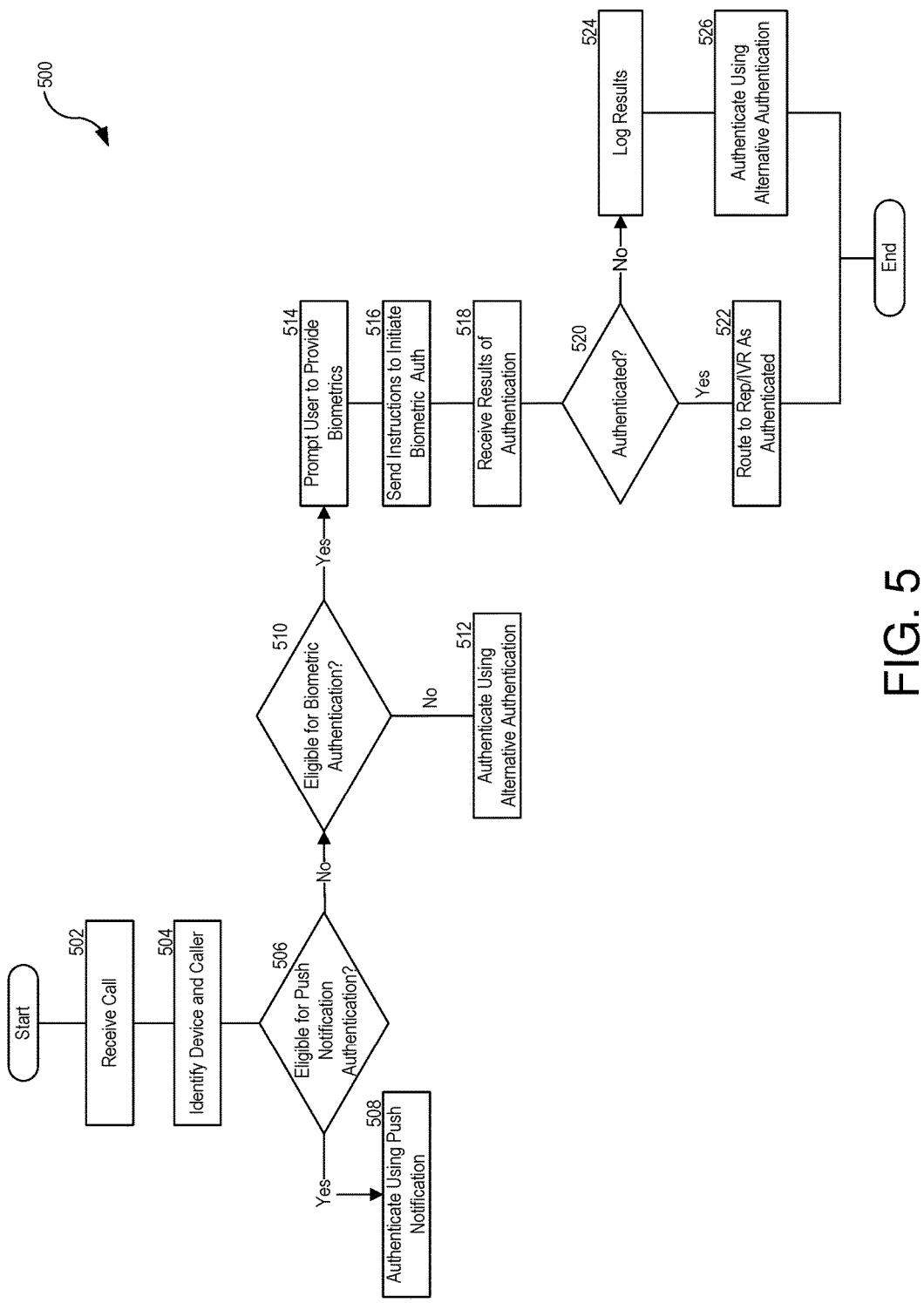
FIG. 5 is a flowchart illustrating a set of operations for authenticating a caller in accordance with various embodiments of the present disclosure.

FIGS. 4-5 are flowcharts illustrating sets of operations for authenticating a caller. In some embodiments, fewer than all of the operations in each set of operations are performed, whereas in other embodiments additional operations are performed. Moreover, in some embodiments, the operations may be performed in different orders or in parallel. The operations can be performed by device 200 illustrated in FIG. 2, third party 135, carrier 145, device issuer 140, and/or various components of authentication platform 120 illustrated in FIG. 3.

Referring to the flowchart 400 of FIG. 4, receiving operation 402 receives a call from a caller. Decision operation 404 determines whether the caller is eligible for biometric authentication via the device. In some embodiments, to be eligible for biometric authentication, the call must be a voice and data call, the caller must be enrolled in biometric authentication for the device, and the call must be a live call between the caller and the enterprise. In some embodiments, to determine whether the caller is eligible for biometric authentication, various third parties, the carrier, and/or the device issuer may be contacted.

When decision operation 404 determines that the caller is ineligible for biometric authentication, decision operation 404 branches to initiating operation 406 in which alternate authentication methods are used to authenticate the user (e.g., representative or IVR asking questions, text message with code or link to a login page). When decision operation 404 determines that the caller eligible for biometric authentication, decision operation 404 branches to initiating operation 408 where a biometric authentication process is initiated. To initiate the biometric authentication process, a device issuer (or other third party) may be contacted to start the process on the caller's device. Prompting operation 410 prompts the user to provide the biometric information (e.g., by providing instructions on the user's device, speaking the instructions into the user's phone). Authenticating operation 412 authenticates the user to the call if the biometric information is verified. The verification may be performed by the device, with the device sending the results to the device issuer who then sends the results to the enterprise. Should the caller be authenticated, the call will be routed to the IVR or a representative and the caller will be authenticated to the call without being asked additional authentication questions.

Referring to the flowchart 500 of FIG. 5, receiving operation 502 receives a call. Identifying operation 504 identifies the device (e.g., ANI, network, location). Decision operation 506 determines whether the caller is eligible for authentication using a push notification, which requires that a mobile application be downloaded to the device. When the caller is eligible for authentication using push notification, decision operation 506 branches to authenticating operation 508 where the caller is authenticated using the mobile application via the push notification. When the caller is ineligible for authentication using the mobile application, decision operation 506 branches to decision operation 510 which determines whether the caller is eligible for biometric authentication via the device. In some embodiments, to be eligible for biometric authentication, the call must be a voice and data call, the caller must be enrolled in biometric authentication for the device, and the call must be a live call between the caller and the enterprise. In some embodiments, to determine whether the caller is eligible for biometric authentication, various third parties, the carrier, and/or the device issuer may be contacted.

When decision operation 510 determines that the caller is ineligible for the biometric authentication, decision operation 510 branches to authenticating operation 512 where the caller is authenticated using an alternative authentication method. When decision operation 510 determines that the caller is eligible for biometric authentication, decision operation 510 branches to prompting operation 514, which prompts the user to provide biometrics via the device. The prompt may be spoken to the user via the call or a message on the user's device. Sending operation 516 sends instructions to the device issuer to initiate the biometric authentication on the device. After the caller inputs the biometric information into the device and the biometric information is verified, receiving operation 518 receives results of the biometric information from the device issuer. Decision operation 520 determines whether the caller is authenticated to the call based on the results received in receiving operation 518. When the caller has been authenticated, decision operation 520 branches to routing operation 522 where the call is routed to an representative or IVR as authenticated. When the caller has not be authenticated (e.g., no response, invalid response), decision operation 520 branches to logging operation 524 where the call results are logged, and the call may be investigated as potentially fraudulent. Authenticating operation 526 authenticates the caller using different methods.

Figure 6:
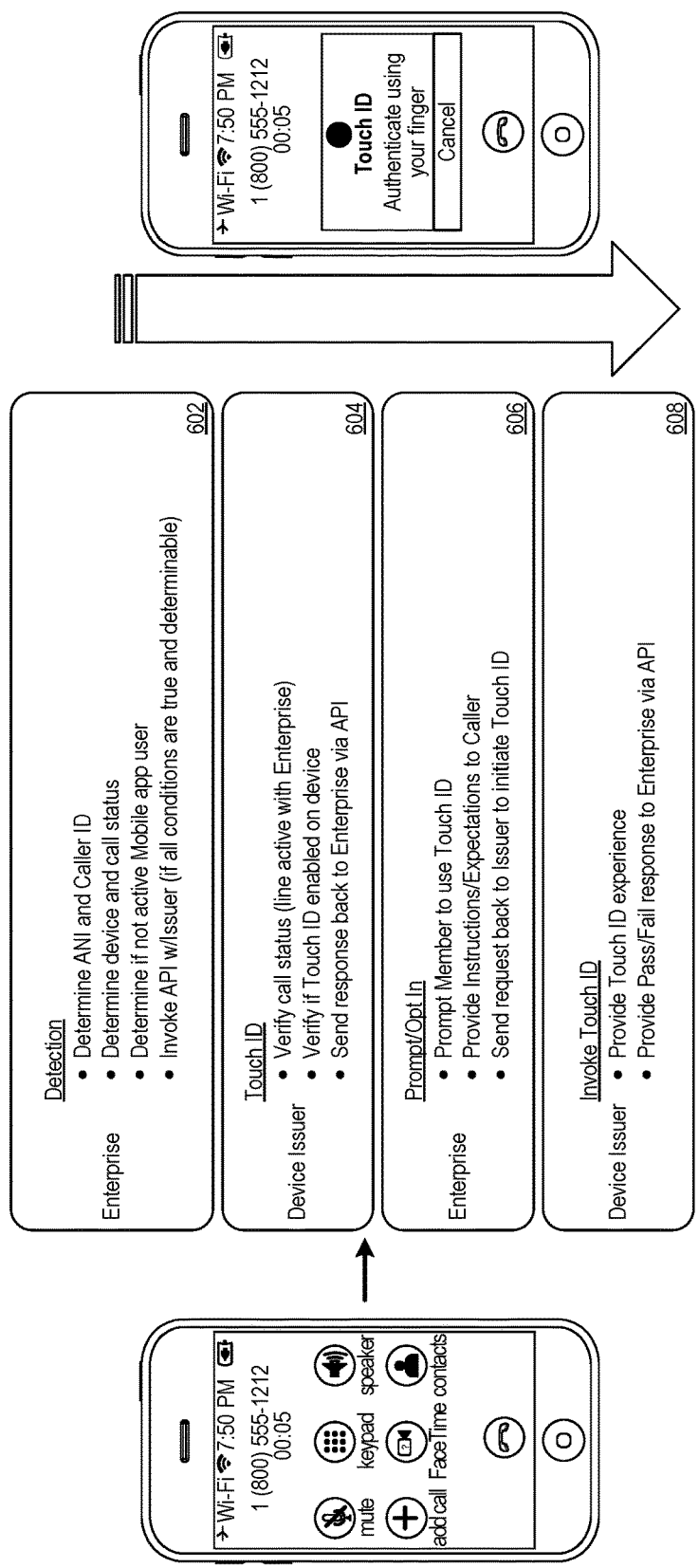
FIG. 6 is an example of a process flow for authenticating a call using biometric authentication in accordance with various embodiments of the present disclosure.

FIG. 6 is an example of a process flow for authenticating a call using biometric authentication. In detection operation 602, performed by the enterprise, the phone number (ANI) and member number or other caller identifier is determined. The device type (e.g., iPhone 5.1, Samsung Galaxy) and call status (e.g., voice, voice and data) are determined. Then, the system determines whether the caller is an active mobile application user. In some embodiments, the mobile application must be downloaded and must have been used within a certain period of time (e.g., within the past 30 days). An API may be invoked between the enterprise and the issuer if all the conditions have been met.

In Touch ID operation 604, performed by a device issuer, the call status is verified to ensure that that call is active with the enterprise. The device issuer further confirms that Touch ID (or other biometric authentication feature) is enabled on the device. The device issuer sends the information regarding the Touch ID back to the enterprise via the API.

In Prompt/Opt In operation 606, the caller is prompted by the enterprise to use the Touch ID feature of the device. The enterprise may provide further instructions or expectations to the caller. The enterprise may send a request to the device issuer to initiate Touch ID on the user's device.

In Invoking operation 608, the enterprise provides the Touch ID experience to the caller's device and provides a pass/fail response to the enterprise via the API.

Figure 7:
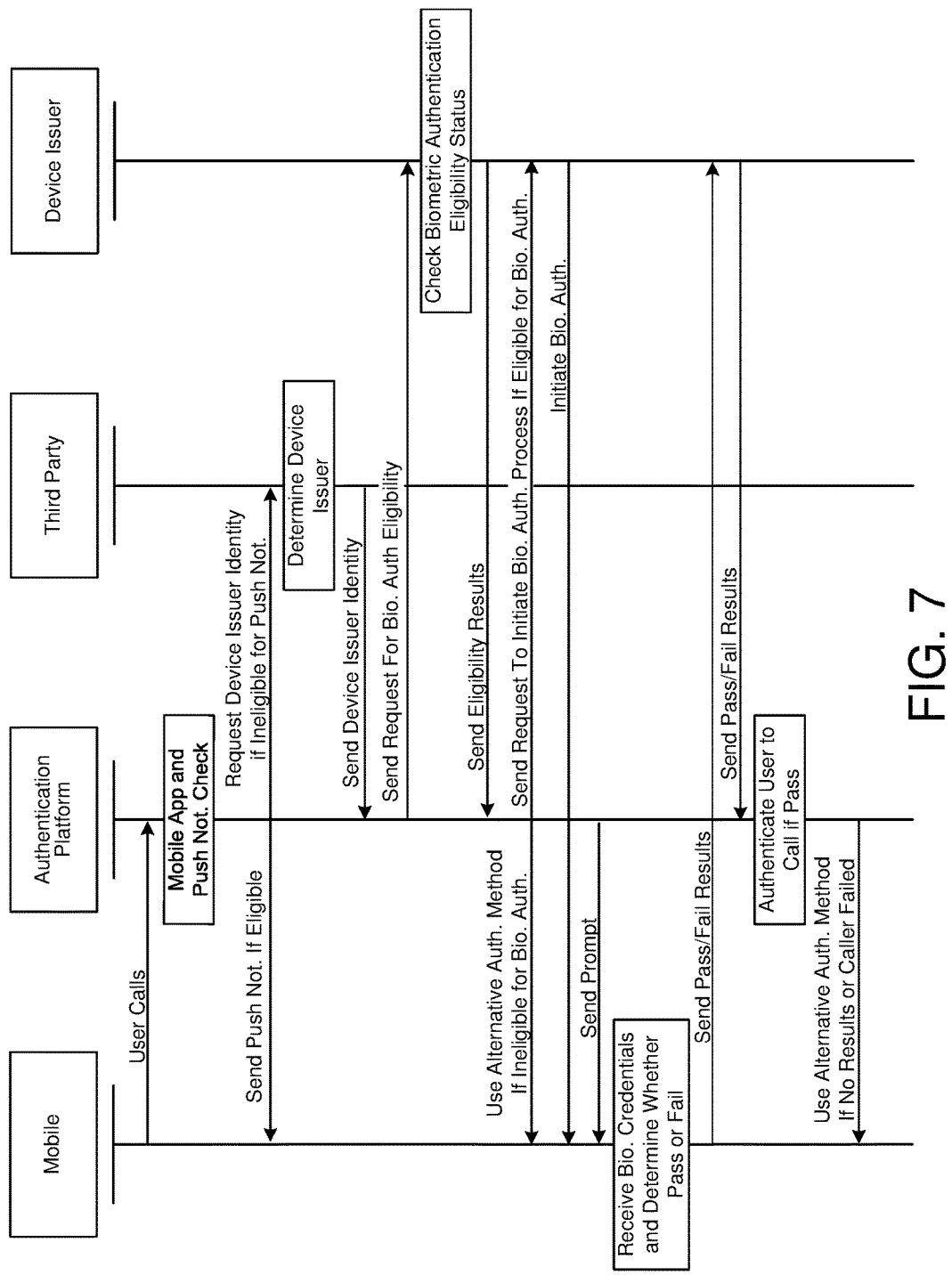
FIG. 7 is a sequence diagram illustrating a sequence of operations for authenticating a caller in accordance with various embodiments of the present disclosure.

FIG. 7 is a sequence diagram illustrating a sequence of operations for authenticating a caller. When the authentication platform receives a call from a device, the authentication platform determines whether the caller is eligible for being authenticated via a mobile application. Thus, the authentication platform determines whether the user has a mobile application and any other requirements for authentication using this method. When the mobile application has been downloaded to the device, a push notification is sent to the device requesting authentication credentials. When the caller has not downloaded the mobile application to the device, the authentication platform requests the device issuer's identity from a third party. The third party determines the device issuer identity. The third party may be a carrier or may contact a carrier in determining the device issuer. Once the device issuer's identity is known, the device issuer's identity is sent to the authentication platform.

The authentication platform sends a request for biometric authentication eligibility to the device issuer. The device issuer determines whether the caller is eligible for biometric authentication by confirming that the call status of the device is "live," that the call is between the caller and the enterprise, and that biometric authentication is enabled on the caller's device. The device issuer then sends the biometric authentication eligibility results to the authentication platform. The authentication platform uses an alternative authentication method if the caller is ineligible for biometric authentication (e.g., a text message with a link, requests answers to secret questions). However, if the caller is eligible for biometric authentication, the authentication platform sends a request to the device issuer to initiate the biometric authentication process. The device issuer then issues the biometric authentication on the caller's device, while the authentication platform sends or speaks a prompt to the caller providing instructions and/or requesting the caller to provide the requested biometric information (e.g., "Please place your finger on the home button for biometric authentication to this call").

The device evaluates the biometric credentials and determines whether the caller passes or fails the biometric authentication. The results are sent to the device issuer. If no results are received, this is reported as well. The device issuer sends the results to the authentication platform. The authentication platform authenticates the caller to the call if the caller passed the authentication test. If no results were received or if the caller failed the test, alternative authentication methods are used.

Computer System Overview

Figure 8:
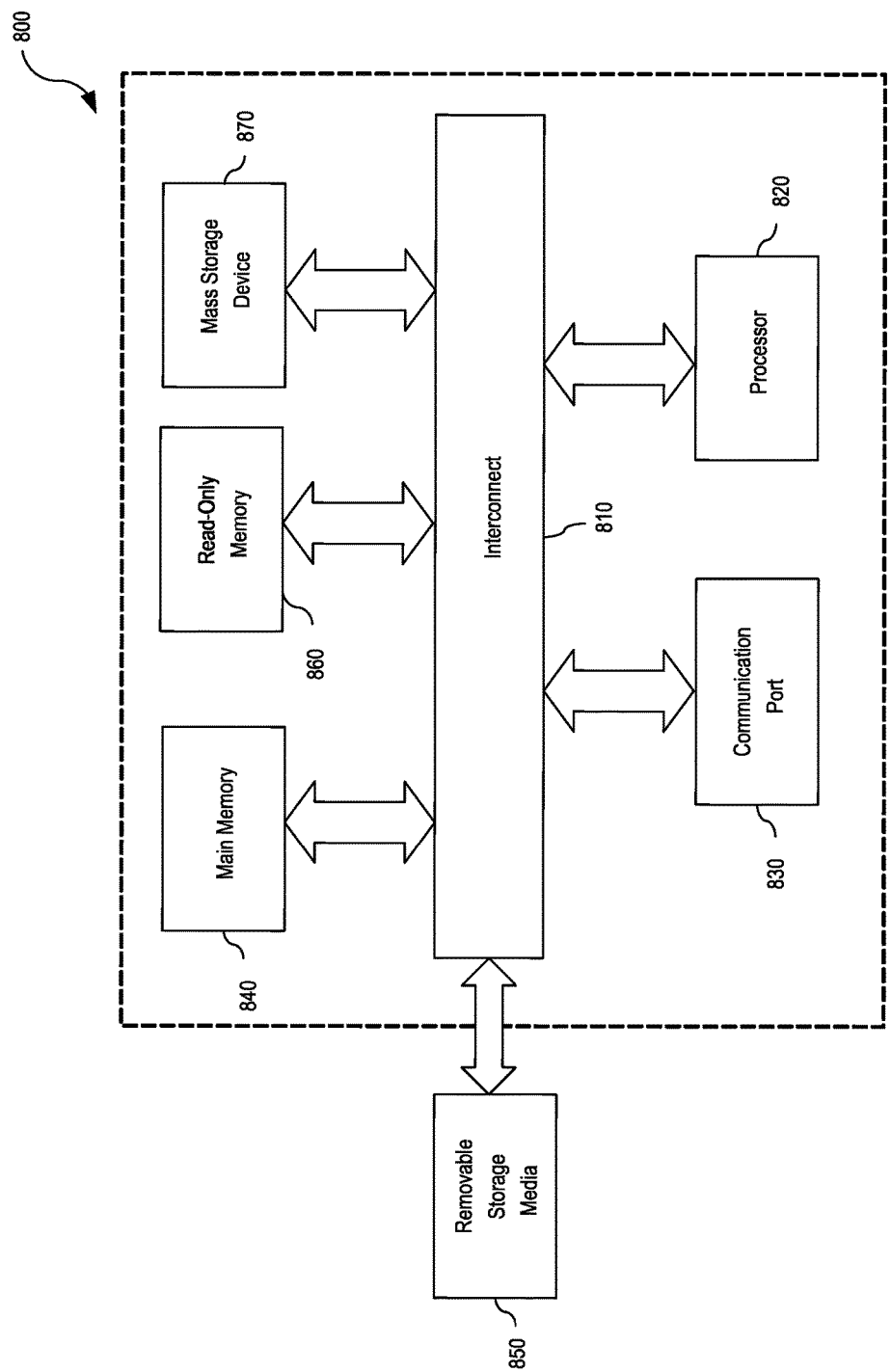
FIG. 8 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes an interconnect 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be random access memory (RAM) or any other dynamic storage device(s) commonly known in the art. Read-only memory 860 can be any static storage device(s) such as Programmable read-only memory (PROM) chips for storing static information, such as instructions for processor 820.

Mass storage 870 can be used to store information and instructions. For example, hard discs such as the Adaptec® family of SCSI drives, an optical disc, an array of discs such as RAID, the Adaptec family of RAID drives, or any other mass storage devices may be used.

Interconnect 810 communicatively couples processor(s) 820 with the other memory, storage, and communication blocks. Interconnect 810 can be a PCI/PCI-X- or SCSI-based system bus, depending on the storage devices used.

Removable storage media 850 can be any kind of external hard-drives, floppy drives, IOMEGA® Zip Drives, Compact Disc-Read-Only Memory (CD-ROM), Compact Disc-Re-Writable (CD-RW), Digital Video Disc-Read-Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authenticating a caller. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
   receiving, via a first network, a call from a device associated with a caller;
   determining whether the caller is qualified for authentication via a first method of authentication,
   wherein determining whether the caller is qualified for authentication via the first method of authentication comprises determining whether a mobile application of an organization has been downloaded to the device;
   in response to the caller being qualified for authentication via the first method of authentication, collecting authentication credentials via the first method of authentication;
   in response to the caller being unqualified for authentication via the first method of authentication, determining whether the caller is qualified for authentication via a second method of authentication;
in response to the caller being qualified for authentication via the second method of authentication:
sending, via a second network, to an issuer of the device, a request to initiate a biometric authentication process on the device, wherein biometric credentials are received by the device;
receiving, via the second network from the issuer of the device, an indication of whether the biometric credentials were verified; and
authenticating the caller to the call or requiring additional authentication credentials based on whether the biometric credentials were verified.

2. The method of claim 1, wherein in response to the caller being unqualified for authentication via the second method of authentication, the method further comprises sending, via the first network, a request for authentication credentials in a text message.

3. The method of claim 1, wherein in response to the call being received via a landline network, the method further comprises authenticating the caller via a third method of authentication.

4. The method of claim 1, wherein the method further comprises determining an identity of the caller based at least in part on characteristics of the device.

5. The method of claim 4, wherein the characteristics of the device include a network of the call and a phone number of the device.

6. The method of claim 1, wherein the method further comprises determining an identity of the issuer of the device based on characteristics of the call.

7. The method of claim 6, wherein the characteristics of the call include an identity of the first network and a phone number of the device.

8. The method of claim 1, in response to the caller being unqualified for authentication via the second method of authentication, the method further comprises routing the call to an interactive voice response system or to a representative to authenticate the caller.

9. The method of claim 1, wherein the caller is qualified for authentication via the second method of authentication in response to a biometric authentication feature being enabled on the device, the call being active, and the device being capable of transferring both voice and data during the call.

10. An authentication platform comprising:
one or more processors; and
a computer readable storage medium having instructions stored thereon, which when executed by the one or more processors cause the authentication platform to:
receive, via a first network, a call from a device associated with a caller,
determine whether the caller is qualified for authentication via a first method of authentication,
wherein determining whether the caller is qualified for authentication via the first method of authentication comprises determining whether a mobile application of an organization has been downloaded to the device,
in response to the caller being qualified for authentication via the first method of authentication, collect authentication credentials via the first method of authentication,
in response to the caller being unqualified for authentication via the first method of authentication, determine whether the caller is qualified for authentication via a second method of authentication,
in response to the caller being qualified for authentication via the second method of authentication:
send, via a second network, to an issuer of the device a request to initiate a biometric authentication process on the device, wherein biometric credentials are received by the device,
receive, via the second network from the issuer of the device, an indication of whether the biometric credentials were verified, and
authenticate the caller to the call or require additional authentication credentials based on whether the biometric credentials were verified.

11. The authentication platform of claim 10, wherein in response to the caller being unqualified for authentication via the second method of authentication, the instructions, when executed by the one or more processors, cause the authentication platform to send, via the first network, a request for authentication credentials in a text message.

12. The authentication platform of claim 10, in response to the caller being unqualified for authentication via the second method of authentication, the instructions, when executed by the one or more processors, cause the authentication platform to route the call to an interactive voice response system or to a representative to authenticate the caller.

13. The authentication platform of claim 10, wherein the instructions, when executed by the one or more processors, cause the authentication platform to determine an identity of the caller based at least in part on characteristics of the device, wherein the characteristics of the device include a network of the call and a phone number of the device.

14. The authentication platform of claim 10, wherein the instructions, when executed by the one or more processors, cause the authentication platform to determine an identity of the issuer of the device based on characteristics of the call, wherein the characteristics of the call include an identity of the first network and a phone number of the device.

15. The authentication platform of claim 10, in response to the caller being unqualified for authentication via the second method of authentication, the instructions, when executed by the one or more processors, cause the authentication platform to route the call to an interactive voice response system or to a representative to authenticate the caller.

16. The authentication platform of claim 10, wherein the caller is qualified for authentication via the second method of authentication in response to a biometric authentication feature being enabled on the device, the call being active, and the device being capable of transferring both voice and data during the call.

17. A non-transitory computer-readable storage medium comprising a set of instructions stored thereon, that when executed by a processor, perform operations comprising:
receiving, via a first network, a call from a device associated with a caller;
determining whether the caller is qualified for authentication via a first method of authentication,
wherein determining whether the caller is qualified for authentication via the first method of authentication comprises determining whether a mobile application of an organization has been downloaded to the device;
in response to the caller being qualified for authentication via the first method of authentication, collecting authentication credentials via the first method of authentication;

in response to the caller being unqualified for authentication via the first method of authentication, determining whether the caller is qualified for authentication via a second method of authentication;

in response to the caller being qualified for authentication via the second method of authentication:

sending, via a second network, to an issuer of the device a request to initiate a biometric authentication process on the device, wherein biometric credentials are received by the device;

receiving, via the second network from the issuer of the device, an indication of whether the biometric credentials were verified; and authenticating the caller to the call or require additional authentication credentials based on whether the biometric credentials were verified.

\* \* \* \* \*